United States Patent
Schmitz et al.

(10) Patent No.: US 11,947,008 B2
(45) Date of Patent: Apr. 2, 2024

(54) DISTANCE MEASURING OPTOELECTRONIC SENSOR AND METHOD FOR DETECTING A TARGET OBJECT

(71) Applicant: SICK AG, Waldkirch (DE)

(72) Inventors: Stephan Schmitz, Waldkirch (DE); Ingolf Braune, Waldkirch (DE)

(73) Assignee: SICK AG, Waldkirch (DE)

( * ) Notice: Subject to any disclaimer, the term of this patent is extended or adjusted under 35 U.S.C. 154(b) by 857 days.

(21) Appl. No.: 17/023,642

(22) Filed: Sep. 17, 2020

(65) Prior Publication Data

US 2021/0109215 A1  Apr. 15, 2021

(30) Foreign Application Priority Data

Oct. 15, 2019 (DE) .......................... 102019127667.5

(51) Int. Cl.
*G01S 7/48* (2006.01)
*G01S 7/481* (2006.01)
*G01S 17/06* (2006.01)

(52) U.S. Cl.
CPC ............ *G01S 17/06* (2013.01); *G01S 7/4808* (2013.01); *G01S 7/4817* (2013.01)

(58) Field of Classification Search
None
See application file for complete search history.

(56) References Cited

U.S. PATENT DOCUMENTS

| 6,225,621 B1* | 5/2001 | Rogers | G01S 7/484 |
| | | | 250/221 |
| 2006/0245717 A1* | 11/2006 | Ossig | G01S 17/89 |
| | | | 385/147 |
| 2011/0180686 A1* | 7/2011 | Iwai | G01S 17/04 |
| | | | 250/205 |

(Continued)

FOREIGN PATENT DOCUMENTS

| DE | 3903501 A1 | 8/1989 |
| DE | 19757849 B4 | 12/2004 |

(Continued)

OTHER PUBLICATIONS

German Search Report dated May 4, 2020 corresponding to application No. 102019127667.5.

*Primary Examiner* — Hovhannes Baghdasaryan
(74) *Attorney, Agent, or Firm* — Nath, Goldberg & Meyer; Jerald L. Meyer

(57) ABSTRACT

A distance measuring optoelectronic sensor for detecting a target object in a monitored zone is provided that has a light transmitter for transmitting light pulses, a deflection unit for a periodic scanning of the monitored zone by the light pulses, a light receiver for generating a received signal from the light pulses reflected or remitted by objects in the monitored zone, and a control and evaluation unit that is configured to determine the distance of an object from a time of flight of a light pulse and to transmit light pulses of different intensity, For the detection of a target object having a specific reflection capability, the control and evaluation (Continued)

Figure 1:
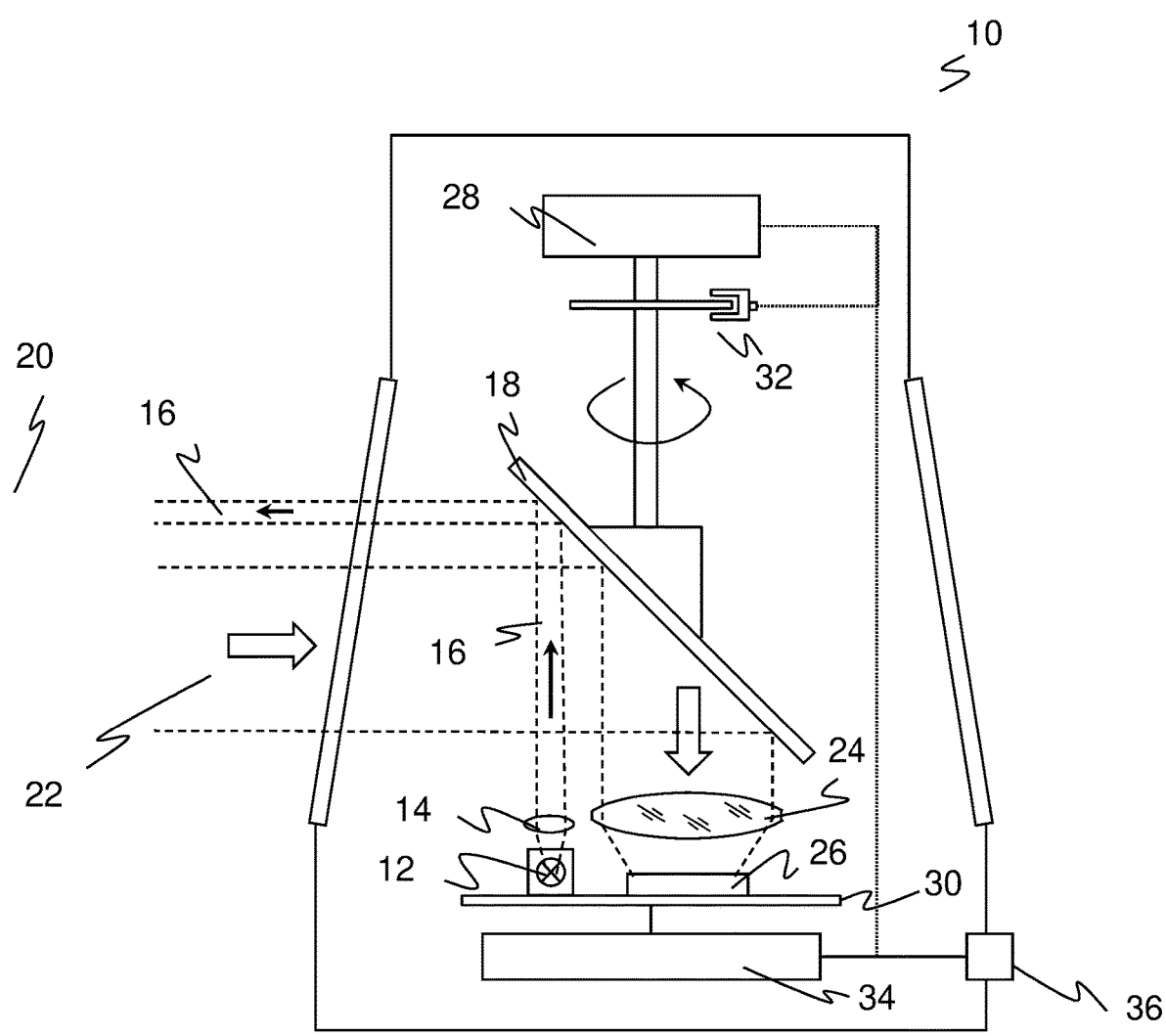

unit is here furthermore configured to transmit light pulses adapted to the reflection capability and to a range and to vary the light pulses in accordance with different ranges for the distinction between the target object and another object.

19 Claims, 4 Drawing Sheets

(56) References Cited

U.S. PATENT DOCUMENTS

| | | | |
|---|---|---|---|
| 2015/0234038 A1* | 8/2015 | Yates | G01S 17/18 |
| | | | 356/5.01 |
| 2017/0045616 A1* | 2/2017 | Masuda | H04N 23/71 |
| 2017/0118459 A1* | 4/2017 | Kim | G01S 17/894 |
| 2018/0113200 A1 | 4/2018 | Steinberg et al. | |
| 2019/0064331 A1 | 2/2019 | Russell et al. | |
| 2019/0196020 A1 | 6/2019 | Aceti et al. | |

FOREIGN PATENT DOCUMENTS

| | | |
|---|---|---|
| DE | 102014100696 B3 | 12/2014 |
| DE | 102018104787 A1 | 9/2019 |
| EP | 1936400 B1 | 12/2007 |
| EP | 2395368 B1 | 6/2010 |
| WO | 2018150999 A1 | 8/2018 |

\* cited by examiner

DISTANCE MEASURING OPTOELECTRONIC SENSOR AND METHOD FOR DETECTING A TARGET OBJECT

The invention relates to a distance measuring optoelectronic sensor, in particular to a laser scanner, the distance measuring optoelectronic sensor comprising a light transmitter for transmitting light pulses, a deflection unit for a periodic scanning of the monitored zone by the light pulses, a light receiver for generating a received signal from the light pulses reflected or remitted by objects in the monitored zone, and a control and evaluation unit that is configured to determine the distance of an object from a time of flight of a light pulse and to transmit light pulses of different intensity and to a method of detecting a target object in a monitored zone, wherein light pulses of different intensity are transmitted and are periodically deflected to scan the monitored zone, with the light pulses reflected or remitted by objects in the monitored zone being received to generate a received signal that is evaluated to determine the distance of a scanned object from a time of flight of a light pulse transmitted and received again.

Distance measuring laser scanners are used in a number of applications for object detection. A light beam generated by a laser periodically sweeps over a monitored zone with the help of a deflection unit. The light is remitted at objects in the monitored zone and is evaluated in the scanner. The periodic scanning is typically achieved in that the transmitted light beam impacts a rotating rotary mirror. The light transmitter, light receiver and associated electronics and optics are fixedly installed in the device and do not also execute the rotary movement. It is alternatively, however also conceivable to replace the rotary mirror with a scanning unit which is also moved. For example in DE 197 57 849 B4, the total measurement head with the light transmitter and light receiver rotates.

A conclusion is drawn on the angular location of the object from the angular position of the deflection unit and additionally on the distance of the object from the laser scanner from the time of flight while using the speed of light. If the monitored zone is a scanning plane, all the possible object positions are detected two-dimensionally using these polar coordinates. An additional scanning movement in elevation or the user of a plurality of scanning beams with offset in elevation respect to one another expands the monitored zone to a three-dimensional spatial zone. In this respect, two general principles are known to determine the time of flight. In phase-based processes, the transmitted light is modulated and the phase shift of the received light with respect to the transmitted light is evaluated. In pulse-based processes, the laser scanner measures the travel time until a transmitted light pulse is received again.

In various applications, the task of the laser scanner comprises selectively detecting determined cooperative targets. Laser scanners and a cooperative target are, for example, attached to vehicles in a transport system of a factory plant and recognize one another by the detection of the cooperative target to evade one another or to brake in good time. The earlier and the more reliably the laser scanners detect the cooperative targets, the faster the vehicles can travel while taking account of the required braking distance and the productivity of the factory plant can naturally be increased with faster vehicles.

These demands are satisfied in principle in that a retroreflector is used as the cooperative target. The light pulses reflected by it are stronger than those of all other objects, even of specular metal surfaces and the like, that also always have a certain backscatter characteristic, that is do not reflect all the light. It is, however, not reliably possible to recognize this intensity difference. This applies in particular because a light receiver is typically designed in a relatively inexpensive manner and only has a small dynamic range. Saturation takes place from a certain point onward so that stronger light pulses only increase the signal amplitude slightly and at some point even no more. A larger dynamic range can be covered by more complex and/or expensive light receivers, but not for the total signal dynamics between the extremes of a reflector at a short range and a dark target at a maximum range.

A known possibility of recognizing a retroreflector is the use of polarized light. In the transmission path, a polarizer generates linearly polarized light, whereas a polarization filter oriented rotated by 90° with respect thereto is arranged in the reception path. The reflection at a retroreflector rotates the polarization direction by 90° so that only this received light can pass and light that was reflected or scattered at other objects is filtered. A corresponding laser scanner for the detection of cooperative targets at transport units of an overhead conveyor is known from WO 2018/150999 A1.

However, additional costs for the polarization filter and production effort for its alignment are produced here. In addition, care must be taken that the optical elements in the light path do not disrupt the polarization. The front lens in particular has to be free of tension-induced birefringence, which is admittedly possible and is explained in DE 10 2018 104 787 A1, but which again means additional effort and/or expense.

The large required dynamic range for a laser scanner is known and there are numerous solution approaches therefor. However, it is not only a question of the detection of a cooperative target here. EP 1 936 400 B1 thus deals with a laser scanner that respectively transmits a prepulse to obtain information on the reception strength before the actual distance measurement and to adapt the transmission strength to it. The modulation thus achieved is still unsuitable to distinguish a cooperative target from another object in a number of cases, which is also not the aim of EP 1 936 400 B1. The adaptation additionally takes place solely from the reception intensity of the prepulse; no distance information is measured therefrom. This would even be counterproductive from the point of view of EP 1 936 400 B1 that considers the prepulse as a requirement for being able to determine a time of flight at all using the subsequent measurement.

Each measurement takes place twice in EP 2 395 368 B1, once with a weak pulse and once with a strong pulse. If the weak pulse results in a sufficient signal-to-noise ratio in the received signal, the time of flight is determined therefrom, otherwise from the strong pulse. This is again admittedly a possibility of dealing with the dynamic range, but not of distinguishing cooperative objects and other objects.

It is therefore the object of the invention to improve the detection of a target object using a sensor of the category.

This object is satisfied by a distance measuring optoelectronic sensor, in particular a laser scanner, and by a method of detecting a target object in a monitored zone in accordance with the respective independent claim. For a pulse-based time of flight process using a light transmitter, light pulses are transmitted and are periodically deflected by a deflection unit to scan the monitored zone. The deflection unit can here be configured as a rotary mirror, as a movable scanning head, or also without movement or with only a micromechanical movement, as is the case with a solid state scanner. A received signal is generated from the light pulses returning after remission or reflection and it is evaluated to determine a distance from its time of flight. The light transmitter is controlled such that light pulses of different strengths are transmitted and thus measurements are carried out using light pulses of a respectively predefined intensity.

The invention starts from the basic idea that only target objects, in particular cooperative targets, having a specific reflection capability are detected and the intensity of the light pulse is modulated for this purpose such that the distinction between a target object and another object in the received signal is possible. Target objects are accordingly a class of objects that is defined by the specific reflection capability. The specific reflection capability is the property by which target objects are recognizable per se. In particular only target objects should be detected that at least have the reflection capability.

In accordance with the invention, it is not a question of a general modulation by which all the detections are, where possible, held in a linear range of the light receiver. It should rather actually have the matching intensity for a target object currently detected at its present distance and having the specific remission capability of the transmitted light pulses. The light pulse is varied to find that intensity at which the target object delivers a received signal that can be distinguished from other objects. The transmission energy is in particular just sufficient to still detect a target object within the range limited thereby. The received pulse becomes too weak for another object and therefore recognizes that it is not a target object. The range and the intensity of the light pulse derived therefrom so-to-say only tests specific distance intervals and not the total range of measurable distances at once up to a maximum range of the sensor for target objects and the sensor thereby becomes sufficiently selective in its detection.

The invention has the advantage that a sufficient signal distance is created between the target object and another target, that is between a cooperative target and a non-cooperative target. This enables a very reliable recognition of the target objects with a brief response time. At the same time, the invention can be implemented inexpensively on the basis of existing sensors without the manufacturing effort substantially increasing. In particular no polarization is necessary, albeit still conceivable, to arrive at even better results by a combination of both measures.

The target object is preferably a retroreflector. The specific reflection capability is then particularly high, higher than with remitting objects of any brightness and even higher than with shiny or specular surfaces. A retroreflector is therefore well-suited to distinguish the target object from other objects. However, the invention also makes it possible to distinguish any desired reflectors, i.e. without retroreflection, from only diffusely remitting objects or to distinguish bright from dark objects.

The control and evaluation unit is preferably configured to set the intensity of a light pulse by the current of the light transmitter. There is thus an easily accessible control value. Since a laser light source is frequently used in the light transmitter, the laser current is then varied. The setting can take place continuously or in steps in range classes.

A plurality of reception channels of different sensitivity are preferably associated with the light receiver. A plurality of light reception elements can be provided for this purpose, for example APDs that operated at different bias voltages and that are therefore of different sensitivity. The sensitivity can also be achieved by different amplification factors of amplifier components arranged downstream. A further possibility comprises electrically branching the received signal and to provide different amplifications in the branches that then form the reception channels.

The control and evaluation unit is preferably configured to increase the intensity of the light pulses toward large and very small ranges. Depending on the sensor, large ranges start at some meters up to many hundreds of meters and more; small ranges accordingly designate the near range up to approximately one meter or also a few meters. The dependence of the required intensity, in particular the current to control the light transmitter, for a specific range can be described in a so-called fadeout curve. It has a minimum at a specific distance. This distance is admittedly very close to the sensor, but is not zero, as would be expected at first glance, but rather at a specific distance where transmission and reception lobes overlap completely for the first time. There are therefore signal losses in the near range due to a lack of overlap that are compensated by higher intensities of the light pulse. In the far range, the matching takes place to compensate the distance-induced drop of the reception intensity, with this drop by no means being as strong as with diffuse remission and also reflection at a shiny surface due to the directed reflection of a retroreflector. The suitable setting for a desired range can be read with reference to the fadeout curve, whether continuously or in range classes.

The control and evaluation unit is preferably configured to transmit light pulses at an intensity that corresponds to a maximum range initially and/or as long as no object or target object has been recognized. The suitable intensity of the light pulse from the top is found using this procedure. For this purpose, the total monitored zone is first covered, with the strongest light pulses provided for this sensor and its specified maximum range. The detection with such strong light pulses alone, such as also corresponds to the procedure of a conventional laser scanner, would, however, by no means ensure that target objects and other objects can be distinguished. It is only a first step to perceive all the objects at all; the matching subsequently takes place by varying the intensity of the light pulse. The strong light pulses are always used when no better information is available, in particular when the sensor starts its measurement and as long as no object has been detected. If a target object has already been detected, whether in a previous angular step of the periodic deflection or in an earlier scanning period, the measurement can be performed with a different intensity of the light pulses in some embodiments described below since an intensity is already known as a starting point at which a target object had been successfully recognized at least once.

The control and evaluation unit is preferably configured to subsequently transmit a light pulse at an intensity corresponding to a range for the measured distance of the object on detection of an object. The sensor has acquired information by the detection of the object and can in a next measurement now match the to a range that corresponds to the actual distance. It is thereby ensured that a target object generates a received signal distinguishable from another object due to its specific reflection capability.

The control and evaluation unit is preferably configured initially to transmit light pulses at a minimum intensity, with the minimum intensity in particular corresponding to a range from which a light pulse is ideally remitted or reflected. The suitable intensity of the light pulse is alternatively found from the bottom using this procedure. It must be remembered that the minimum intensity does not correspond to the extreme near range, but rather to a point of maximum sensitivity at a specific distance, which has already been explained above in connection with fadeout curves.

The control and evaluation unit is preferably configured to increase the intensity of at least one further light pulse until either an object is detected or the intensity corresponds to a maximum range. An object is so-to-say thus just detected for the first time by a stepwise increase of the intensity of the light pulses. When locating the suitable intensity of the light pulses from above, sufficient information is immediately detected by the initial measurement to use the correct intensity in the second step. A stepwise matching is required from below since here simply nothing is measured as long as the energy is not sufficient. If no object is detected even with an intensity of the light pulses that corresponds to a maximum range of the sensor, the measurement produces an empty monitored zone at this scanning angle and a beginning is made again from the start at the minimum intensity to find an object at the next scanning angles where possible.

The control and evaluation unit is preferably configured to distinguish the target object and another object at an intensity of the light pulse set for a target object using the intensity of the received signal. Once the suitable intensity of the light pulses has been set from the top or bottom, the requirements have been met to reliably distinguish the target objects and other objects. A target object generates a clear received pulse; another object does not generate any received pulse or at best only a weak received pulse. The separation takes place by a threshold or by all the other methods known from laser scanners for detecting a received pulse, with the difference that now the sensitivity is set specifically for target objects of the specific reflection capability and not as with conventional laser scanners for any desired objects. When approaching from below, the distance of the object can also be used as a criterion. The intensity was iteratively increased in accordance with a range of a target object. It is conceivable that the energy is now sufficient for the first time to detect an object having a weaker remission capability at a shorter distance. A target object should therefore also be close to the range for which an intensity had been set.

The control and evaluation unit is preferably configured to maintain a set intensity of the light pulse in the same periodic scan and/or in a following periodic scan within an angular range of the target object or to adapt it to an expectation of the distance of the target object. The procedure described up to now provides for respectively measuring at the initial intensity again after the detection of a target object or, when approaching from below, also after reaching the maximum intensity without an object detection. It fact there is, however, an expectation that a measurement in an angular environment of the detection of the target object also again impacts the target object. It is therefore a possibility to maintain the intensity once set for as long as the target object is still detected by it and only then to return to the initial intensities. This is a local procedure in the same periodic scan. It is, however, also conceivable to track target objects over a plurality of periodic scans (object tracking). All the powerful algorithms known per se are available for this purpose which are, for example, based on Kalman filters and with which a prediction can be made from the history as to the angular range and the distance in and at which a target object will be located in a next periodic scan. If a distance change of the target object is predicted in this process, the previously set intensity is adapted thereto. It is made possible by such optimization processes to use a greater number of measurements for a recognition of the target object and to lose fewer measurements for setting the suitable intensity.

The control and evaluation unit is preferably configured to return to an initial intensity of the light pulses, in particular to a minimum or maximum intensity, as soon as the target object is no longer detected. The settings of the intensity for a target object may only be maintained for as long as the respective scan actually impacts the target object. If therefore the angular range of the target object is left or if the tracking algorithm loses a target object, a search is again made for target objects as at the beginning.

The control and evaluation unit is preferably configured also to measure the distance of a target object during its detection and to adapt the intensity of the light pulse on its change. It is conceivable that a target object has a contour that results in relevant distance changes or that a further target object is disposed in front of the target object detected first in a new angular step. With object tracking over a plurality of periodic scans, the target object can have come closer or moved away. In all these cases, it is not the first set intensity that should fixedly be used for the target object, but a follow-up adaptation should rather take place.

In an advantageous further development, a system is provided that has a plurality of vehicles, in particular railbound vehicles, that each have at least one sensor in accordance with the invention and at least one target object, in particular a retroreflector, with the mutual positions of the vehicles being recognized with reference to the detection of the target objects by the sensors to avoid accidents. The retroreflectors are the target objects. The vehicles are, for example, AGVs (automated guided vehicles) or other transport units of a logistics or transport system that travel freely or on rails. A preferred example is an overhead conveyor of, for instance, a foundry, whose individual carriages are the vehicles. The vehicles in particular avoid accidents using the mutual detection of the retroreflectors by their laser scanners by braking in good time at critically short distances.

The target objects preferably have a coding of part regions of different reflection capability. The target objects are in particular retroreflectors having non-reflective part regions. In the scanning, this produces a specific change between detection and non-detection, that is a code that can additionally be used for the identification and distinction of reflections at specular surfaces.

The method in accordance with the invention can be further developed in a similar manner and shows similar advantages in so doing. Such advantageous features are described in an exemplary, but not exclusive manner in the subordinate claims dependent on the independent claims.

Figure 2:
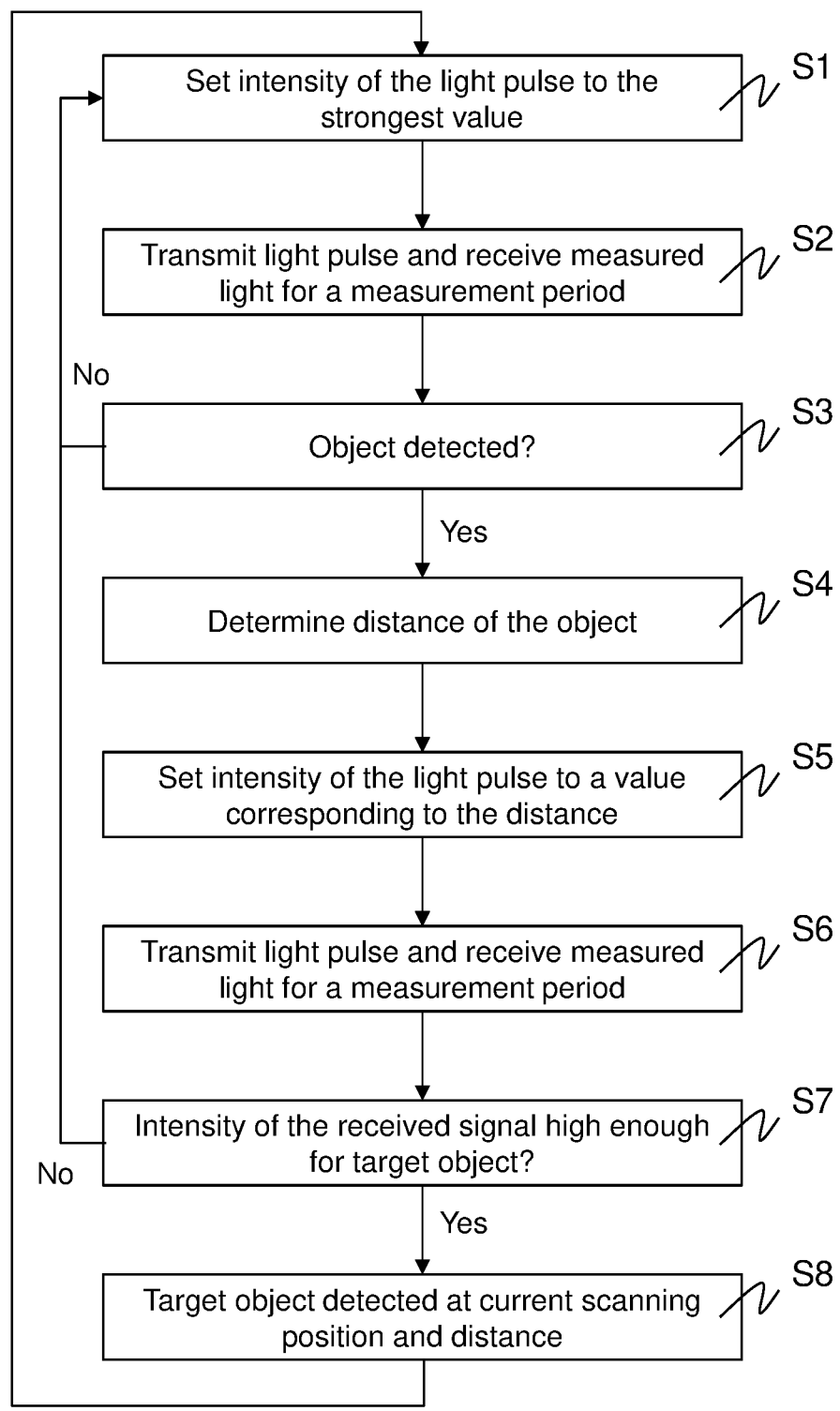
Figure 3:
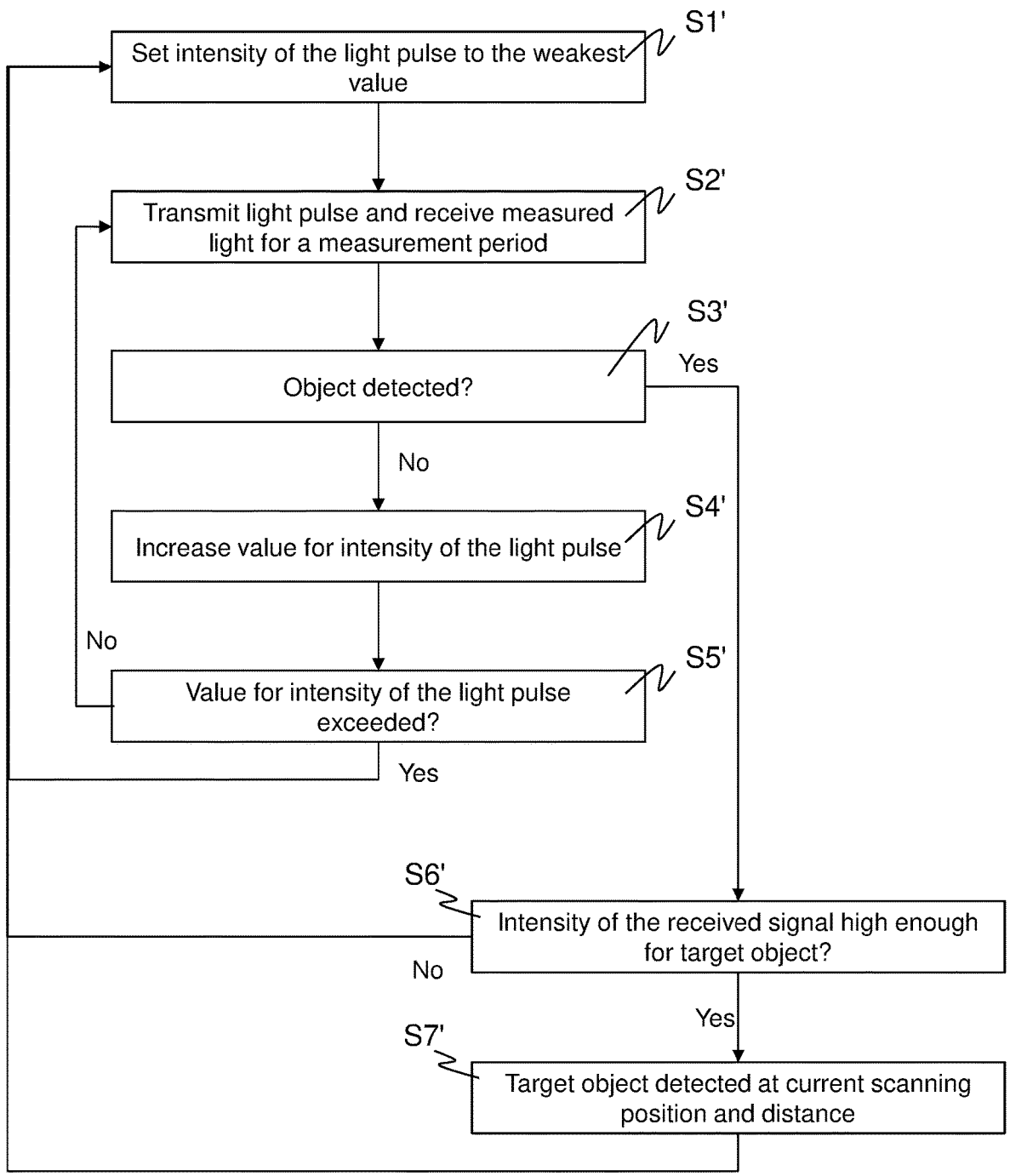
Figure 4:
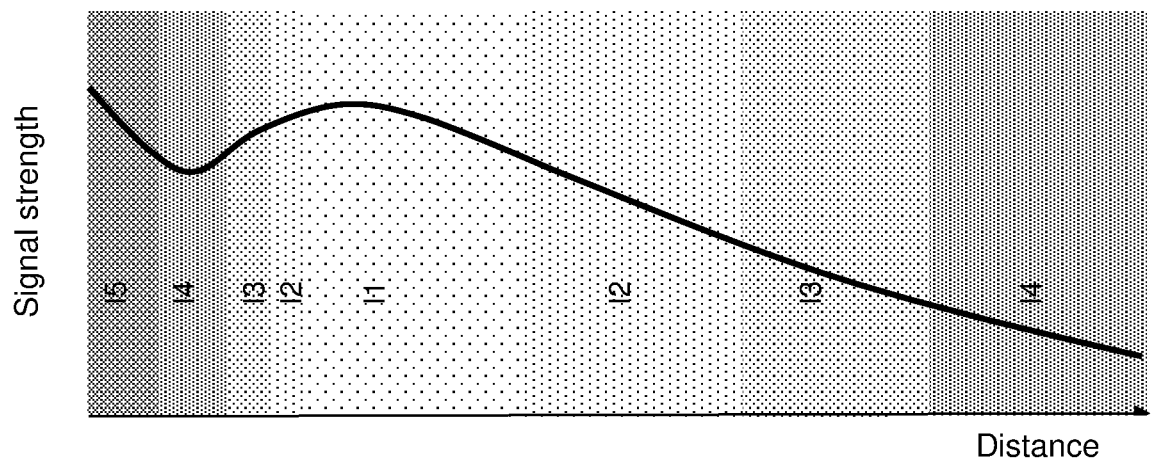
Figure 5:
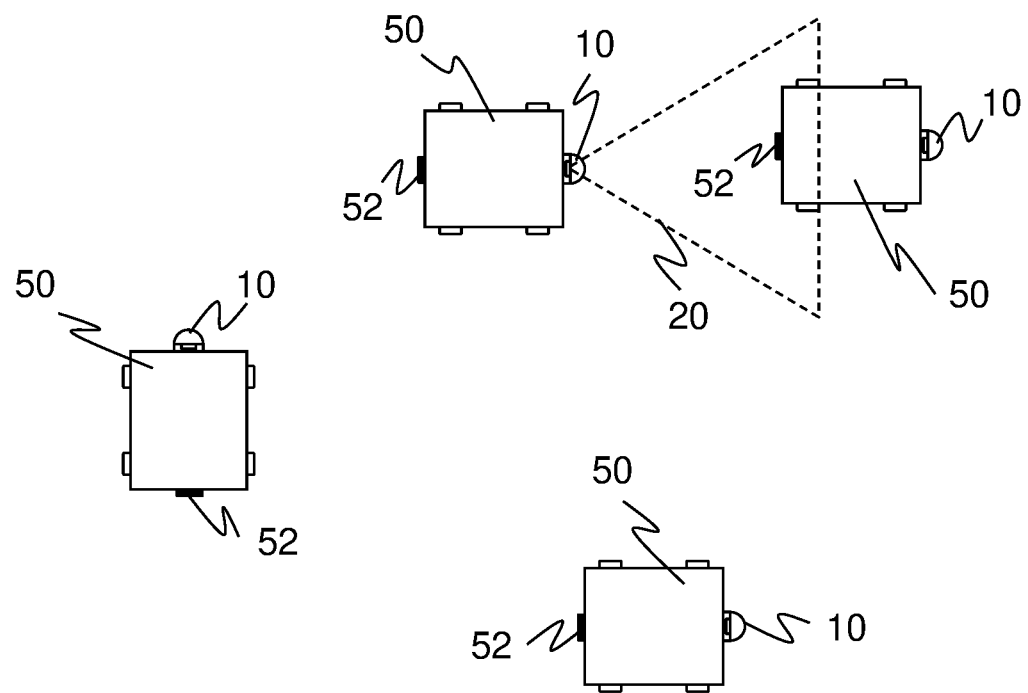

The invention will be explained in more detail in the following also with respect to further features and advantages by way of example with reference to embodiments and to the enclosed drawing. The Figures of the drawing show in:

FIG. 1 a schematic sectional representation of a laser scanner;

FIG. 2 an exemplary flowchart for setting the intensity of the light pulse starting from a high intensity;

FIG. 3 an exemplary flowchart for setting the intensity of the light pulse starting from a small intensity;

FIG. 4 a representation of the signal strength in dependence on the distance of the scanned objects and an exemplary grading of suitable laser currents; and FIG. 5 a schematic representation of vehicles with laser scanners and retroreflectors that recognize one another using the mutual detection of the retroreflectors.

FIG. 1 shows a schematic sectional representation through a sensor in accordance with the invention that is designed as a laser scanner 10. A light transmitter 12, for example having a laser light source in the infrared or in another spectrum, generates, with the aid of a transmission optics 14, transmitted light 16 with light pulses which is deflected at a deflection unit 18 into a monitored zone 20. The light pulses are preferably very short, for instance in the range from 0.5 to 2.5 ns, or even shorter depending on the technical possibilities. Light pulses can be single pulses, but also simple codes of some pulses, bursts, or double pulses.

If the transmitted light 16 is incident on an object in the monitored zone 20, reflected or remitted light 22 again arrives back at the laser scanner 10 and is there detected via the deflection unit 18 and by means of a reception optics 24 by a light receiver 26, for example a photodiode or an APD (avalanche photodiode). The received signal of the light receiver 26 is evaluated directly in an analog or digital manner depending on the embodiment, for example using a threshold, or in an AD converter, preferably digitized with a resolution of at least one fifth of the pulse width and buffered for the evaluation.

The deflection unit 18 is configured as a rotary mirror in this embodiment and rotates continuously by a drive of a motor 28. Alternatively, a measuring head with a light transmitter 12 and a light receiver 26 can rotate. Further alternative designs use a rotary prism or a tiltable crystal lens. Solid state scanners without macroscopic moving parts are also possible that achieve a scan by MEMS, an optical phased array, an acoustooptical modulator or similar or that emulate a movement by a direct activation of specific light sources of the light transmitter 12 and pixels of the light receiver 26, with then, for example, the light transmitter 12 being a VCSEL array and the light receiver 26 being a SPAD array.

The transmitted light 16 generated by the light transmitter 12 thus sweeps over the monitored zone 20 generated by the rotary movement. The design of the transmission optics 14 and reception optics 24 can also be varied, for instance via a beam-shaping mirror as a deflection unit, a different arrangement of the lenses, or additional lenses. Laser scanners are in particular also known in an autocollimation arrangement. In the embodiment shown, the light transmitter 12 and the light receiver 26 are accommodated on a common circuit board 30. This is also only an example since separate circuit boards and other arrangements, for example with a mutual vertical offset, can be provided.

Instead of a light receiver 26 having only one light reception element, a plurality of light reception elements can also be provided, in particular APDs. A plurality of received signals are thereby then generated that detect a larger dynamic range in an approximately linear manner by, for example, different bias voltages at the APDs and/or different post-amplification together. The received signal is alternatively electrically branched. The laser scanner 10 then respectively no longer has only one reception channel, but a plurality of reception channels of different sensitivity, for example one sensitive, one medium sensitive, and one insensitive reception channel.

The respective angular position of the motor 28 or of the deflection unit 18 is detected by an angle measuring unit 32, here by way of example in the form of a co-rotating code disk and a forked light barrier. If now light 22 remitted by the light receiver 26 is received from the monitored zone 20, a conclusion can be drawn on the angular position of the object in the monitored zone 20 from the angular position of the deflection unit 18 measured by the angle measurement unit 32. In addition, the time of flight from the transmission of a light pulse up to its reception after reflection at the object in the monitored zone 20 is preferably determined and a conclusion is drawn on the distance of the object from the laser scanner 10 using the speed of light.

This evaluation takes place in an evaluation unit 34 which is connected for this purpose to the light transmitter 12, to the light receiver 26, to the motor 28, and to the angle measuring unit 32. Two-dimensional polar coordinates of all the objects in the monitored zone 20 are thus available via the angle and the distance.

The control and evaluation unit 34 is moreover configured for a distinction to be explained immediately of specific target objects having a specific reflection capability, in particular retroreflectors, from other objects and varies the intensity of the transmitted light pulses for this purpose. At least this part of the evaluation can alternatively also take place externally in that the required measurement and control data are exchanged with a higher ranking system over an interface 36.

The function of the laser scanner 10, in particular on the detection of specular surfaces and retroreflectors should first be looked at in a little more depth with reference to a numerical example. The deflection unit 18 rotates at a certain rotational frequency $f_{rot}$ of here $f_{rot}$=50 Hz. The measurement repetition rate at which light pulses are transmitted by the light transmitter 12 determines the angular resolution of the scan and should be selected here such that a light pulse is generated every 0.1°. This produces measurements over a rotation $N_{meas}$=360°/0.1°=3600. The exact angular association takes place with the aid of the angle measurement unit 32. The measurement period consequently amounts to $$T_{rep} = \frac{1}{f_{rot} N_{meas}} = 5.6 \mu s.$$

The optimized distinction of target objects having a specific reflection capability of the laser scanner 10 in accordance with the invention will be described for the example of retroreflectors. The risk of confusion is primarily present with metallically high gloss surfaces. A larger percentage of the transmitted light 16 admittedly arrives back at the laser scanner 10 from a retroreflector since with a metallic reflector, as with diffusely scattering objects, there is the typical $$\frac{1}{r^2}$$

drop with the distance that is more or less pronounced depending on the specific metallic surface. However, it must be anticipated that the difference only amounts to 20%-30%.

This signal difference could in principle already be distinguished if the received signal actually detects it. This is, however, a substantial challenge due to the signal dynamics over six orders of magnitude that is due to the different remission capability of the objects and their different spacings. Conventionally a laser scanner 10 is configured such that the light pulses have a maximum strength to also detect an object with low remission capability at a larger distance. For the extreme case of a near retroreflector, the light receiver 26 is then completely overcontrolled so that the strength of a light pulse is no longer expressed in its amplitude in the received signal, but the pulse width rather increases. The signal difference can therefore practically not be resolved or at best only poorly. In this respect, the strength of a light pulse in this description is defined via the light intensity, i.e. the amplitude or the level of the received signal. The energy would alternatively be the area below the light pulse, with the area, however, scaling directly with the amplitude with a constant pulse shape as long as the light receiver is not overcontrolled.

The invention builds on the idea that only retroreflectors are still detected with a measurement using substantially less transmission energy. Attenuated light pulses are used for the measurement for this purpose that are configured in accordance with a smallest specified retroreflector during a still permitted rotation. To find the suitable transmission energy for the actual distance of the retroreflector, this distance is determined in advance, for example, with a still overcontrolled measurement, as explained with respect to FIG. 2, or the laser scanner 10 approaches the distance iteratively, as explained with respect to FIG. 3.

The retroreflector is detected in the linear range in this manner and this makes possible a reliable distinction using the above-named signal difference of at least 20%-30% even in the most unfavorable case. In practice, the laser current can be varied above the laser threshold for the light transmitter 12. For the above-indicated measurement period of 5.6 µs, for example, $N_{Pulse}=5$ different powers $I_{Laser}$ could be transmitted and this leaves leeway for various procedures to determine the suitable transmission energy. A measurement time $$t_{meas} = \frac{T_{Delta}}{N_{Pulse}} = 1.1 \mu s$$

is thus still available for every pulse that is still sufficient to cover a distance of up to at least 20 m. An exemplary distribution $I_{Laser1}=50$ mW, $I_{Laser2}=100$ mW, $I_{Laser3}=200$ mW, $I_{Laser4}=400$ mW, $I_{Laser5}=800$ mW. The transmission energy is effectively also varied in that the amplification in the reception path is manipulated, for instance in that the bias voltage is adjusted with respect to an APD of the light receiver 26.

FIG. 2 shows a flowchart for an exemplary procedure from above, i.e. starting from a strong light pulse, to find the suitable transmission energy. The correct distance of an object is determined using the strong light pulse in a test-wise measurement that is still overcontrolled to then subsequently carry out a modulated measurement suitable for the direct detection of retroreflectors.

In a step S1, the intensity of the light pulse is initially set to a strongest value for this purpose. This intensity should still be sufficient for a detection of objects even at a maximum range of the laser scanner 10 with a maximally unfavorable rotation of the retroreflector that reduces its effective surface.

A measurement is then carried out at this strongest intensity of the light pulse in a step S2, i.e. the light pulse is transmitted and, if it is incident on an object, is received again. This measurement will react to any desired object up to the maximum range.

A check is made in a step S3 whether a remitted or reflected light pulse is received and thus an object was detected. If not, the strongest intensity is also fixed for the next measurement in step S1. If an object is detected, its distance is determined by means of a time of flight process in a step S4.

In a step S5, the intensity of the light pulse is now set to a value at which a retroreflector is just still reliably detected at the measured distance and the corresponding measurement is carried out in a step S6.

In a step S7, it is evaluated whether the object that was detected in step S3 is a target object or retroreflector or not. The implicit assumption here is that the two measurements in steps S2 and S5 scan the same object, which is permissible due to the minimal angular step. In the above numerical example, only 1.1 µs or 0.02° are between the measurements. The intensity of the light pulse is configured by step S5 such that a retroreflector is just still recognized. Other objects having a lower remission capability are ignored or at least detected by a distinguishably lower reception level at this intensity of the light pulse. The adapted intensity of the light pulse moreover provides that the reception path remains in the at least largely linear range. The received pulse of the retroreflector can therefore be reliably detected in the received signal since signal differences of 20%-30% are actually mapped in the received signal by the linear detection and this Is also a sufficient signal distance for a reliable distinction.

If the object from step S5 is not a target object in accordance with step S7, the next measurement again starts at the strongest intensity in step S1. Otherwise a target object is detected in step S8 and both the associated angular position and the distance are known so that evaluations disposed downstream can respond accordingly. The process is then likewise continued at the strongest intensity with the next measurement in step S1. Alternative embodiments will still be described later that do not simply return into the starting state after detection of a target object.

FIG. 3 shows a flowchart for a further exemplary procedure from below, i.e. starting from weak light pulses, to find the suitable transmission energy. The laser scanner 10 here scans ahead at ever larger distances at the initially weakest light pulses and then increasingly stronger light pulses until a retroreflector is detected as the first of all the conceivable objects.

In a first step S1', the intensity of the light pulse is set to a weakest value. The energy is only sufficient to detect a retroreflector at an optimum distance. It will be explained later with reference to FIG. 4 and to its so-called fadeout curve that this optimum distance is not necessarily the shortest distance, but can be disposed at a certain distance from the laser scanner 10.

In a step S2', measurement is made with a light pulse of this weakest intensity and a check is made in a step S3' whether an object is detected in this process. If this is not the case, the intensity of the light pulse is increased in a step S4'. The higher intensity makes it possible to detect a retroreflector even closer in the near region with the next measurement at a greater distance or in accordance with the fadeout curve.

A check is made in a step S5' whether the new higher intensity already exceeds the maximum value. As long as this is not the case, a retroreflector is sought with increasingly stronger pulses in an iterative loop of steps S2' to S4'. As soon as the maximum value for the intensity has been exceeded, it is clear that no retroreflector is located in this scanning direction and a start is made again from the start in step S1' with the weakest value for the intensity to seek retroreflectors in a new scanning direction.

If an object is detected in step S3', the received signal is checked in a step S6' as to whether the object is a target object or retroreflector. The reception level can, on the one hand, be evaluated using very typical processes, for example using a threshold, for this purpose, with this threshold being placed in accordance with the remission capability of a retroreflector. This then corresponds to the evaluation of step S7 in FIG. 2 only that the suitable value for the intensity of the transmitted light pulse was found in a different manner. It is additionally also possible to determine the distance of the object in step S6'. This distance should be close to the range limit of the transmitted light pulse at this intensity for a retroreflector. At a shorter distance, it is a different object since a retroreflector at the shorter distance would have already been detected in an earlier iteration at a lower intensity of the light pulse.

A target object is detected in step S7' and both the associated angular position and the distance are known so that evaluations disposed downstream can respond accordingly. The process is then continued at the weakest intensity again with the next measurement in step S1'.

As already indicated with respect to FIG. 2, the process can be optimized in that, subsequent to the detection of a target object, a measurement is not again made at the initial, strongest or weakest intensity. The intensity can, for example, also only be increased or reduced by a certain portion in the direction of the initial value. Alternatively, the value for the intensity of the light pulse remains at the adapted value for as long as the target object is recognized with further measurements and only returns partially or completely to the starting value again after a non-recognition of the target object. The measured distance still has to be monitored here so that a second, closer retroreflector is recognized.

The provisional maintenance of a once set intensity is a simple example for an object tracking within a revolution of the deflection unit 18. More complex processes are also conceivable. In the following revolutions, the angular segments of the previously detected retroreflectors are already known and better start values for the intensity of the light pulse can thus be used in these scan regions than minimum or maximum values. In this respect, certain tolerances for an interim relative movement of the retroreflector can be provided. An object tracking is also conceivable that predicts the future angular positions and distances adopted by a retroreflector from the history. Such optimization measures shorten the response time because fewer scans are lost for the calibration of the intensity. It also makes plausibility checks possible so that individual disruptions are not mistakenly recognized as a target object.

FIG. 4 shows a representation of the signal strength in dependence on the distance of the scanned object and thus the fadeout curve already addressed a number of times. Distance regions having matching increasing laser currents I1 . . . I5 are highlighted in different gray scales to set an intensity of the light pulses for the respective distance region. If retroreflectors should therefore be detected in a certain distance region, the associated laser current must be set for this purpose. The curve shown designates the threshold with reference to which a distinction is made between a retroreflector and a metallically specular object. The specific curve progression and the associated laser currents are dependent on the specific design of the laser scanner and are only shown by way of example.

In accordance with the curve progression in FIG. 4, there is a distance region where transmission lobes and reception lobes of the laser scanner 10 completely overlap for the first time. It is possible to work with the lowest energy or the smallest laser current I1 there. Toward larger distances, transmission energy is then increasingly required, with this also being able to be set continuously instead of discretely in steps I2 . . . I5. A higher intensity is, however, also required in the near region where the overlap between the transmission and reception lobes becomes lower and at some time marginal to receive a relevant signal at all.

FIG. 5 shows an application example. Vehicles 50 are each equipped with at least one laser scanner 10 and at least one cooperative target or retroreflector 52. The vehicles 50 are, for example, AGVs (automated guided vehicles) or other mobile transport units in a logistics or transport system that travel freely or in a rail-bound manner. In a preferred application, it is the carriage of a suspended conveyor device, specifically in the field of microsystem engineering or semiconductor manufacture (foundry). The laser scanners 10 respectively detect the retroreflectors 52 of the other vehicles 50 and recognize their relative positions with respect to one another from this. Collisions can thus be avoided in that the vehicles 50 evade one another, adapt speeds, or trigger a braking procedure where necessary.

The more exact the measurement and the shorter the response time is in this process, the faster the vehicles 50 can travel since they respond to one another in a more timely and targeted manner. Not only static detections are useful here, but also more complex evaluations as described above. For example, it can be determined by object tracking that a preceding vehicle 50 accelerates so that it does not, for instance, have to be braked, but can rather even likewise be accelerated. The required data evaluation preferably takes place autonomously per vehicle 50, but can equally be taken over or assisted by a higher ranking control.

In a further embodiment, the retroreflectors 52 are encoded with a pattern in that at least one change is provided between a reflection region and a non-reflective or absorption region. An improved suppression of interference is thereby achieved. It is even conceivable that the vehicles 50 individually recognize one another with reference to the coding or receive trip instructions, for example to maintain a specific minimum distance from the vehicle 50 having the correspondingly encoded retroreflector 52.

The invention claimed is:

1. A distance measuring optoelectronic sensor for detecting a target object in a monitored zone, the distance measuring optoelectronic sensor comprising:
    a light transmitter for transmitting light pulses;
    a deflection unit for a periodic scanning of the monitored zone by the light pulses;
    a light receiver for generating a received signal from the light pulses reflected or remitted by objects in the monitored zone; and
    a control and evaluation unit that is configured to determine a distance of an object from a time of flight of a light pulse and to transmit light pulses of different intensity,
    wherein, for the detection of a target object having a specific reflection capability, the control and evaluation unit is further configured to transmit light pulses adapted to the reflection capability of the target object and to a distance range and to correspondingly vary the light pulses in accordance with different distance ranges to distinguish between the target object and another object, and
    wherein the control and evaluation unit is further configured to increase the intensity of the light pulses toward large and very small ranges.

2. The distance measuring optoelectronic sensor in accordance with claim 1,
    wherein the distance measuring optoelectronic sensor is a laser scanner.

3. The distance measuring optoelectronic sensor in accordance with claim 1,
    wherein the target object is a retroreflector.

4. The distance measuring optoelectronic sensor in accordance with claim 1,
wherein the control and evaluation unit is configured to set the intensity of a light pulse by the current of the light transmitter.

5. The distance measuring optoelectronic sensor in accordance with claim 1,
wherein a plurality of reception channels of different sensitivity are associated with the light receiver.

6. The distance measuring optoelectronic sensor in accordance with claim 1,
wherein the control and evaluation unit is configured to transmit light pulses at an intensity corresponding to a known maximum distance range initially and/or as long as no object or target object has been recognized.

7. The distance measuring optoelectronic sensor in accordance with claim 6,
wherein the control and evaluation unit is configured to subsequently transmit a light pulse at an intensity corresponding to a distance range for the measured distance of the object on detection of an object.

8. The distance measuring optoelectronic sensor in accordance with claim 1,
wherein the control and evaluation unit is configured initially to transmit light pulses at a minimum intensity.

9. The distance measuring optoelectronic sensor in accordance with claim 8,
wherein the minimum intensity corresponds to a minimal distance range from which a light pulse is detectably remitted or reflected.

10. The distance measuring optoelectronic sensor in accordance with claim 8,
wherein the control and evaluation unit is configured to increase the intensity of at least one further light pulse until either an object is detected or the intensity corresponds to a known maximum distance range.

11. The distance measuring optoelectronic sensor in accordance with claim 1,
wherein the control and evaluation unit is configured to distinguish the target object and another object at an intensity of the light pulse set for a target object using the intensity of the received signal.

12. The distance measuring optoelectronic sensor in accordance with claim 1,
wherein the control and evaluation unit is configured to maintain a set intensity of the light pulse in the same periodic scan and/or in a following periodic scan within an angular range of the target object or to adapt it to an expectation of the distance of the target object.

13. The distance measuring optoelectronic sensor in accordance with claim 1,
wherein the control and evaluation unit is configured to return to an initial intensity of the light pulses.

14. The distance measuring optoelectronic sensor in accordance with claim 13,
wherein the control and evaluation unit is configured to return to a minimum or maximum intensity as soon as the target object is no longer detected.

15. The distance measuring optoelectronic sensor in accordance with claim 1,
wherein the control and evaluation unit is configured also to measure the distance of a target object during its detection and to adapt the intensity of the light pulse on its change.

16. A system having a plurality of vehicles that are in particular rail-bound and that each have at least one distance measuring optoelectronic and at least one target object, wherein the mutual positions of the vehicles are recognized with reference to the detection of the target objects by the distance measuring optoelectronic sensors to avoid accidents, the distance measuring optoelectronic sensor comprising:
a light transmitter for transmitting light pulses;
a deflection unit for a periodic scanning of the monitored zone by the light pulses;
a light receiver for generating a received signal from the light pulses reflected or remitted by objects in the monitored zone; and
a control and evaluation unit that is configured to determine a distance of an object from a time of flight of a light pulse and to transmit light pulses of different intensity,
wherein, for the detection of a target object having a specific reflection capability, the control and evaluation unit is further configured to transmit light pulses adapted to the reflection capability of the target object and to a distance range and to correspondingly vary the light pulses in accordance with different distance ranges to distinguish between the target object and another object, and
wherein the control and evaluation unit is further configured to increase the intensity of the light pulses toward large and very small ranges.

17. The system in accordance with claim 16, wherein the target objects have a coding of part regions of different reflection capability.

18. The system in accordance with claim 16, wherein the target object is a retroreflector.

19. A method of detecting a target object in a monitored zone, comprising:
transmitting light pulses of different intensity;
periodically deflecting the light pulses to scan the monitored zone;
receiving the light pulses reflected or remitted by objects in the monitored zone;
generating a received signal from the light pulses reflected or remitted by objects in the monitored zone; and
evaluating the received signal to determine a distance of a scanned object from a time of flight of a light pulse transmitted and received again,
wherein, for the detection of a target object having a specific reflection capability, light pulses adapted to the reflection capability of the target object and to a distance range are transmitted,
wherein the light pulses are varied in accordance with different distance ranges to distinguish between a target object and another object, and
wherein the intensity of the light pulses is selectively increasable toward large and very small ranges.

* * * * *